Patented July 10, 1951

2,559,790

UNITED STATES PATENT OFFICE 2,559,790

CYCLOPENTADIENE-VINYL ACETATE POLYMERS

Carl F. Peters, Chicago, Ill., assignor to Velsicol Corporation, Chicago, Ill., a corporation of Illinois No Drawing. Application July 19, 1946, Serial No. 684,793

7 Claims. (Cl. 260—17)

This invention relates to novel resinous compositions and to methods of producing them.

An object of the invention is to provide a resin of pale color and possessing excellent resistance to water and alkali.

Another object is to provide a resin which is compatible with nitrocellulose lacquers and films.

Another object is to provide a resin which may be used in the form of a spirit varnish.

Another object is to produce a resin which is compatible with drying oils thus making possible its use in oleoresinous coating compositions.

These and other objects and advantages of the products and methods of the invention will become apparent on further consideration of the following specification.

I have discovered that resinous compositions meeting the requirements listed above, and possessing other desirable properties as well, may be produced by copolymerizing, under proper conditions, cyclopentadiene and unsaturated esters of monohydric alcohols and mono- or poly-carboxylic acids. Either or both of the monohydric alcohol and carboxylic acid from which the ester is derived may be unsaturated.

Cyclopentadiene, when polymerized alone either thermally or with the aid of catalysts such as those of the Friedel-Crafts type, diatomaceous earth, alumino-silicates and the like, forms thermoplastic resins of varying degrees of hardness and color. The utility of these resins is greatly limited, however, by the fact that they are all incompatible with nitrocellulose lacquers and films and usually also incompatible with unsaturated triglyceride drying oils. It is also known that cyclopentadiene may be copolymerized with other hydrocarbon olefins or dienes, usually by catalytic methods, but these polymers are also incompatible with nitrocellulose films.

It is known that when cyclopentadiene is heated with certain unsaturated organic compounds at about 360° F. or lower, Diels-Alder adducts are formed by a 1,4-1,2 addition, one mol of the diene reacting with one mol of the unsaturate. Occasionally, and depending upon the amount of the diene present, another mol of cyclopentadiene will react with the adduct, again by a Diels-Alder reaction. All these reaction products are well-defined compounds of low molecular weight which are volatile and readily distillable at reduced pressures.

I have found that cyclopentadiene may be copolymerized with unsaturated esters of monohydric alcohols and mono- or poly-carboxylic acids, either or both of the alcohol and acid being unsaturated, by simple thermal treatment of the mixture at temperatures essentially above 390° F. and usually below 575° F. to yield resinous products ranging from viscous liquids to hard resins, essentially free from the aforementioned objectionable volatile compounds. I have found that the temperature range specified, that is, about 390° F. to 575° F. is particularly conducive to maximum copolymerization of the diene with the unsaturated ester and to minimum formation of low molecular weight, volatile Diels-Alder addition products. By regulating the proportion of unsaturated ester in the reaction mixture, and the time and temperature of copolymerization, either liquids or solid copolymers which are compatible with nitrocellulose films can be obtained.

The number of unsaturated esters of monohydric alcohols and carboxylic acids is of course very large; and, as would be expected, the characteristics of the copolymers of these esters with cyclopentadiene vary to some extent with the particular ester involved, with the proportions of the reactants utilized, and with the specific conditions of the copolymerization. Among the esters of unsaturated monohydric alcohols and saturated carboxylic acids which I have utilized in the process of my invention are vinyl acetate, vinylstearate, allyl stearate, allyl acetate, diallyl adipate, diallylphthalate, and diallyl oxalate; among esters of saturated monohydric alcohols and unsaturated carboxylic acids, ethyl oleate, ethyl linoleate, ethyl crotonate, methyl methacrylate, ethyl acrylate, dimethyl maleate, methyl cinnamate, dimethyl fumarate, methyl abietate, triethyl itaconate, and diethyl acetylenedicarboxylate; among esters of unsaturated monohydric alcohols and unsaturated carboxylic acids, allyl oleate, allyl linoleate, allyl cinnamate, vinyl linoleate, allyl crotonate, triallyl itaconate.

I have found that, in order to produce copolymers that are compatible with nitrocellulose films, it is necessary to employ a certain minimum proportion of the ester. If the proportion of ester is decreased below this required minimum, but still not less than another and lower limiting value, copolymers may be produced which, while not compatible with nitrocellulose, are compatible with raw and bodied drying and non-drying unsaturated triglycerides or varnish oils; and mixtures of these copolymers and unsaturated triglycerides form varnishes and paints which possess excellent color and resistance to water, acid, and alkali. The possibilities of these modifications will be made more apparent from the examples hereinafter described.

A particularly useful example of an ester of an unsaturated monohydric alcohol and a saturated carboxylic acid in forming the copolymers of my invention is vinyl acetate. I have found that in order to obtain a solid resin or viscous copolymer compatible with nitrocellulose films the reaction mixture of cyclopentadiene and vinyl acetate must not contain less than about 25 per cent nor more than about 56 per cent of the ester. Copolymers containing less than about 25 per cent of the ester, when mixed with nitrocellulose solutions, produce lacquer films which have a tendency to "blush," that is, the films become opaque when the solvents have evaporated. Copolymers containing more than about 56 per cent of the ester, on the other hand, will contain appreciable or substantial amounts of the objectionable low molecular weight volatile products referred to above.

I have also found that it is essential that the temperature of copolymerization be maintained at not less than about 390° F., since below this temperature the copolymers become contaminated with Diels-Alder crystalline polymers of cyclopentadiene which are insoluble in the copolymer and incompatible with lacquer films. However, such reaction mixtures can be made compatible with nitrocellulose by subsequently heating them at about 500° F. for relatively short periods of time. At reaction temperatures above 575° F., the copolymers are higher in molecular weight, but their color darkens progressively as the temperature of copolymerization is raised.

As would be expected, the minimum percentage of any given ester that must be copolymerized with cyclopentadiene according to my invention to obtain a resinous composition compatible with nitrocellulose will vary to some extent with the particular ester. In general, I have found this minimum percentage to be somewhat greater than in the case of vinyl acetate, and is frequently of the order of 28 to 30 per cent or even higher.

Cyclopentadiene-vinyl acetate thermal copolymers containing 25 per cent or less of vinyl acetate are, as mentioned above, incompatible with nitrocellulose films. The extent of blushing of the copolymer-lacquer films increases as the percentage of ester in the copolymer is decreased. However, such copolymers have been found to be compatible with raw and bodied drying and non-drying unsaturated triglycerides, or varnish oils, and mixtures of these copolymers with such unsaturated triglycerides form varnishes and paints which have excellent color and resistance to water, acid, and alkali; for such purposes, however, my copolymers of cyclopentadiene and vinyl acetate should contain not less than about five per cent of the ester. In this connection it may be noted that straight cyclopentadiene resins, formed by either catalytic or thermal polymerization of cyclopentadiene, are usually incompatible with bodied drying oils, and therefore have limited applications. However, by adding about 5 per cent or more of vinyl acetate to cyclopentadiene and heating the reaction mixture at temperatures essentially above 390° F., resinous copolymers are obtained which are pale in color, have good water and alkali resistance, and which can be readily cooked into bodied drying oils. They are soluble in the usual lacquer diluents, and in aromatic and naphtha solvents.

The thermal copolymerization of cyclopentadiene with vinyl acetate and other unsaturated esters obviates the use of the conventional type of polymerization catalysts such as the Friedel-Crafts type, thereby also eliminating the need for acid-resistant equipment and neutralization of the polymerized reaction mixture with subsequent separation of inorganic matter. Furthermore, a thermal copolymerization lends itself to a continuous type process whereby the reactants are fed through a reaction tube surrounded by a heat exchange medium, the reaction being controlled by the length of time the reactants are in the reaction tube, and also by the temperature of polymerization. The copolymerizations may also be carried out in batches by placing the reactants in a sealed pressure vessel, and heating externally, or internally (as by means of a heating coil), for the required length of time. The products are cooled, and poured into drums or other suitable containers, or distilled to remove volatile components.

The copolymerizations herein described are conducted either in the presence or absence of air, there being no appreciable difference in the products, or the reaction conditions, when either method is used; as a safety precaution, however, an inert atmosphere, such as of nitrogen, may be employed. Neither does the addition of small amounts of organic peroxides (1-2%) seem to have any effect on the copolymerization or the products produced. At the temperatures employed, the peroxides are probably very rapidly destroyed and so lose their utility as polymerization promoters. Solvents for the monomers and the reaction products, such as toluol, naphtha, or lacquer diluent, may or may not be added before polymerization without departing from the scope of my invention.

The plastic copolymers herein described which are compatible with nitrocellulose form, in conjunction with nitrocellulose, lacquer films which compare very favorably with alkyd resin-nitrocellulose lacquers with respect to gloss, printing and abrasion resistance, ultra violet resistance, and adhesion. The copolymers which are incompatible with nitrocellulose films but which are compatible with unsaturated triglycerides, form, with the latter, oil varnishes which are pale in color (6-7 Hellige), and such oleoresinous varnishes form films which dry very rapidly to a tack-free state, and have excellent gloss and resistance to water and aqueous alkali.

In preparing the cyclopentadiene-ester copolymers herein described I prefer to use a good grade of cyclopentadiene (95-100% pure) or a similar grade of dicyclopentadiene and esters of similar purity. However, this invention is not limited to such high degree of purity for the starting materials, and hydrocarbon fractions containing essentially cyclopentadiene, dicyclopentadiene or the diene Diels-Alder polymers of cyclopentadiene (as, for example, the trimer, tetramer, or pentamer), such as special cuts of "crude solvent naphtha" and by-products from cracking of gaseous hydrocarbon mixtures, etc., may be used as the source of cyclopentadiene in the reaction, and slightly impure grades of the ester may also be used. It is presumed that dicyclopentadiene concentrates produce cyclopentadiene during the reaction, and this polymerizes with the unsaturated ester. Distillation subsequent to the copolymerization removes the unreactive components, leaving the solid or viscous copolymer as a residue.

The following examples of preparation of the copolymers of my invention are given for purposes of illustration, not limitation, and will demonstrate to those skilled in the art the versatility and wide range of applicability of the processes and products of my invention. In order to facilitate a clearer understanding of the effects of the variables involved, the first six examples describe the production of copolymers of cyclopentadiene and vinyl acetate under varying conditions of preparation. Examples 13, 15 and 16 likewise illustrate the use of an unsaturated ester derived from an unsaturated monohydric alcohol and a saturated carboxylic acid. Examples 7, 8, 9, 10 and 11 illustrate the use of an unsaturated ester derived from a saturated monohydric alcohol and an unsaturated carboxylic acid. In Examples 12 and 14, both the alcohol and acid from which the ester is derived are unsaturated.

*Example 1*

A mixture of 29 g. of vinyl acetate and 66 g. of cyclopentadiene dissolved in 20 g. of toluene is placed in a steel bomb. The sealed bomb is then heated at 525° F. for two hours. The cooled solution is distilled to a still temperature of 500° F. in vacuo. The yield of solid resin is 76%, and has the following properties: M. P. 195° F. (ball and ring); color 2½ (Barrett scale); compatible with nitrocellulose lacquers, the films being hard, glossy, and possessing good adherence to glass, wood or metal.

*Example 2*

A mixture of 66 g. of cyclopentadiene and 25 g. of vinyl acetate is placed in a steel bomb, together with 0.25 g. of benzoyl peroxide. The bomb is flushed out with nitrogen, sealed, and then heated at 500° F. for four hours. The product, when cool, is a clear, plastic copolymer, which has the following properties: M. P. 193° F.; color 1 to 1½; compatible with nitrocellulose lacquers, the films being similar to those as described in 1, but paler in color.

Repeating the above procedure in the absence of organic peroxides, and in the presence of or absence of air, produced products with no essentially different characteristics.

*Example 3*

A mixture of 265 g. of cyclopentadiene and 100 g. of vinyl acetate is placed in a steel bomb, and the sealed bomb heated at 485–490° F. for thirty hours. The product is a pale colored, solid, clear resin, which has the following properties: M. P. 205° F.; color 8–9 (Hellige scale); compatible with nitrocellulose solutions giving very pale colored lacquers. The films are hard, glossy, and have excellent adhesion to glass, wood and metal.

*Example 4*

A mixture of 265 g. of cyclopentadiene and 100 g. of vinyl acetate is placed in a steel bomb, and the sealed bomb heated at 500° F. for sixteen hours. The product is a solid, clear resin which has the following properties: M. P. 220° F.; color 10 (Hellige scale); compatible with nitrocellulose lacquers, the films being similar to those described in Example 1.

*Example 5*

A mixture of 85 g. of cyclopentadiene and 15 g. of vinyl acetate is placed in a steel bomb, and the sealed bomb heated at 500° F. for four hours. The product is a pale yellow, solid, clear resin, which has the following properties: M. P. 231° F.; color 7–8 (Hellige scale); compatible with nitrocellulose solutions, but the films blush when the solvent evaporates. This resin is, however, compatible with raw or bodied unsaturated triglyceride oils, and varnishes containing this copolymer are very pale in color and dry rapidly to a "tack free" state.

*Example 6*

A mixture of 120 g. of cyclopentadiene and 80 g. of vinyl acetate is placed in a steel bomb, and the sealed bomb heated at 485° F. for sixteen hours. The product is a clear, pale yellow, liquid, which is compatible with nitrocellulose films, but the films are rather soft. Heating for another sixteen hours at 485° F. changed the liquid into a viscous, clear "syrup," which has a 7 color (Hellige), and Z viscosity (Gardner). This copolymer, when mixed with nitrocellulose solutions, produced lacquer films which were very pale in color, and also were glossy, hard and very adherent.

*Example 7*

A mixture of 66 g. of cyclopentadiene and 27 g. of dimethylmaleate is placed in a steel bomb, and the sealed bomb heated at 475° F. for five hours. The product is a pale yellow, clear, solid resin, which has the following properties: M. P. 164° F.; color 5–6 (Hellige); compatible with nitrocellulose solutions, the resulting lacquers being almost water white in color.

*Example 8*

A mixture of 70 g. of cyclopentadiene and 38 g. of triethylaconitate is placed in a steel bomb, and the sealed bomb heated at 475° F. for five hours. The product is an amber, clear, solid resin, having the following properties: M. P. 156° F.; color 9–10 (Hellige); compatible with nitrocellulose solutions, but the films blush slightly when the solvent evaporates. These resins are compatible with bodied or unbodied unsaturated triglycerides, thereby forming excellent oleoresinous coating compositions.

*Example 9*

A mixture of 66 g. of cyclopentadiene and 63 g. of methyl abietate is placed in a steel bomb, in a nitrogen atmosphere, and the sealed bomb is heated at 500° F. for five hours. The product is a pale colored, clear resin, which has the following properties: M. P. 160° F.; color 9–10 (Hellige scale); compatible with drying oils when the mixture is cooked at 525–550° F. for two hours; incompatible with nitrocellulose films.

*Example 10*

A mixture of 66 g. of cyclopentadiene and 27 g. of dimethylfumarate is heated in a steel bomb, nitrogen atmosphere, at 500° F. for three hours. The product is a clear, hard, pale colored resin, which has the following properties: M. P. 186° F.; color 8 (Hellige scale); soluble in aromatic and naphtha solvents; compatible with nitrocellulose films and with drying oils.

*Example 11*

A mixture of 75 g. of cyclopentadiene and 25 g. of the ethyl esters of linoleic and linolenic acids is heated in a steel bomb, nitrogen atmosphere, at 510° F. for five hours. (Pure linoleic acid is not commercially available. The material used contained 60% linoleic acid and 40% linolenic acid; both acids are, of course, unsaturated, and closely related chemically.) The product is a pale yellow, clear, soft resin, which have the following properties: M. P. 150° F.; color 7-8 (Hellige scale); soluble in aromatic and naphtha solvents. Incompatible with nitrocellulose films, but the resin can be cooked into drying oils at 525° F., giving improved flexibility to the varnish films. Nonsaponifiable matter=28.3, indicating that 62.2 per cent of the diene copolymerized with the esters.

*Example 12*

A mixture of 66 g. of cyclopentadiene and 34 g. of allyl linoleate-linolenate is heated in a steel bomb, nitrogen atmosphere, at 500° F. for six hours. The product is a pale yellow, soft resin which has the following properties: M. P. 160° F.; color 8 (Hellige); soluble in aromatic and naphtha solvents. Incompatible with nitrocellulose films, but the resin can be cooked into drying oils at 525° F., giving improved flexibility to the varnish film.

*Example 13*

A mixture of 70 g. of cyclopentadiene and 30 g. of allyl benzoate is heated in a steel bomb, nitrogen atmosphere, at 510° F. for four hours. The product is a pale yellow, hard, clear resin, which has the following properties: M. P. 175° F.; color 9 (Hellige); soluble in aromatic and naphtha solvents; compatible with drying oils when cooked at 525° F.

*Example 14*

A mixture of 80 g. of cyclopentadiene and 20 g. of diallyl phthalate is heated in a steel bomb, nitrogen atmosphere, at 500° F. for four hours. The copolymer is a hard, pale colored resin, which has the following properties: M. P. 315° F.; color 6 (Hellige); soluble in aromatic and naphtha solvents. Incompatible with nitrocellulose, but can be cooked into drying oils at 550° F. to form pale colored varnishes which have excellent hardness and durability.

*Example 15*

300 g. of a petroleum fraction containing approximately 30 per cent dicyclopentadiene, and 20 per cent of other materials which are subject to thermal polymerization, is mixed with 18.6 g. of vinyl acetate. This solution is heated in a stainless steel bomb, nitrogen atmosphere, at 485° F. for six hours. The resin solution is distilled to 525° F., in vacuo, the yield of solid, clear copolymer being 50.0 per cent. The properties of the resin areas follows: M. P. 157° F.; color 11 (Hellige); soluble in aromatic and naphtha solvents. This resin is not compatible with nitrocellulose, but can be cold cut into drying oils and the resulting vehicle makes an excellent varnish.

*Example 16*

300 g. of a petroleum fraction containing dicyclopentadiene (see previous example) and 62.4 g. of vinyl acetate is heated in a steel bomb, nitrogen atmosphere, at 485° F. for sixteen hours. The resin solution is distilled to 525° F., in vacuo, the yield of solid, clear copolymer being 59.2 per cent. This resin has the following properties: M. P. 153° F.; color 12+ (Hellige); soluble in aromatic and naphtha solvents. This resin can be formulated with nitrocellulose lacquers, as well as with drying oils.

It will be apparent from the foregoing specification and the examples included that there is considerable latitude in the choice of the particular ester utilized in forming the copolymers of my invention, in the proportions employed, and in the details of processing such as time, temperature, and other conditions of preparation. Other ramifications and modifications of my invention that will naturally suggest themselves to those skilled in the art are considered to be comprehended within the scope of my invention as defined in the claims.

I claim as my invention:

1. As a new composition of matter, a resinous copolymer composed of cyclopentadiene and vinyl acetate containing from about 5 to about 56 per cent of vinyl acetate.

2. As a new composition of matter, a resinous copolymer composed of cyclopentadiene and vinyl acetate containing from about 25 to about 56 per cent of vinyl acetate, said copolymer being compatible with nitrocellulose.

3. As a new composition of matter, a nitrocellulose lacquer containing a resinous copolymer composed of cyclopentadiene and 25 per cent to 56 per cent vinyl acetate.

4. A process for copolymerizing cyclopentadiene and vinyl acetate which comprises heating a mixture of cyclopentadiene and vinyl acetate containing from about 5 to about 56 per cent of vinyl acetate and the balance cyclopentadiene at a temperature of from about 390° F. to about 575° F. for a period of from about one-half hour to about twenty-four hours.

5. A process for producing a resinous composition compatible with nitrocellulose films which comprises thermally copolymerizing a mixture of cyclopentadiene and vinyl acetate containing from about 25 per cent to about 56 per cent vinyl acetate and the balance cyclopentadiene at a temperature of from about 390° F. to about 575° F. for a period of from about one-half hour to about twenty-four hours.

6. A process for producing a resinous composition incompatible with nitrocellulose but compatible with unsaturated triglyceride oils which comprises thermally copolymerizing a mixture of cyclopentadiene and vinyl acetate containing less than about 25 per cent but at least about 5 per cent vinyl acetate and the balance cyclopentadiene at a temperature of from about 390° F. to about 575° F. for a period of from about one-half to about twenty-four hours.

7. A process for producing a new resinous composition of matter which comprises thermally copolymerizing a mixture of about 44 per cent to 95 per cent cyclopentadiene and about 5 per cent to 56 per cent vinyl acetate in a reaction zone at a temperature of from about 390° F. to about 575° F., while introducing the cyclopentadiene to said reaction zone in the form of a cyclic diene Diels-Alder polymer thereof.

CARL F. PETERS.

REFERENCES CITED

The following references are of record in the file of this patent:

UNITED STATES PATENTS

| Number | Name | Date |
|---|---|---|
| 2,047,398 | Voss | July 14, 1936 |
| 2,262,002 | Hopff | Nov. 11, 1941 |
| 2,336,208 | Alder and Rickert | Dec. 7, 1943 |
| 2,349,418 | Glowacki et al. | May 23, 1944 |
| 2,352,606 | Alder and Windemuth | July 14, 1944 |
| 2,387,895 | Gerhart | Oct. 30, 1945 |

FOREIGN PATENTS

| Number | Country | Date |
|---|---|---|
| 17,378 | Great Britain | 1900 |
| 561,645 | Great Britain | May 30, 1944 |